US006572376B1

(12) United States Patent
Saunders

(10) Patent No.: US 6,572,376 B1
(45) Date of Patent: Jun. 3, 2003

(54) AVIONICS MAINTENANCE TRAINING DEVICE

(75) Inventor: Craig D. Saunders, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/900,902

(22) Filed: Jul. 10, 2001

Related U.S. Application Data
(60) Provisional application No. 60/252,809, filed on Nov. 22, 2000.

(51) Int. Cl.[7] .................................................. G09B 9/08
(52) U.S. Cl. .................... 434/30; 434/372; 434/219; 434/55; 446/7; 703/4; 244/194
(58) Field of Search .................... 434/372, 30, 219, 434/55; 446/7; 703/4; 244/194

(56) References Cited

U.S. PATENT DOCUMENTS

| | | | | |
|---|---|---|---|---|
| 2,243,973 | A | * | 6/1941 | Mills ........................... 434/51 |
| 4,347,055 | A | | 8/1982 | Geiger |
| 4,463,605 | A | * | 8/1984 | McDowell et al. ........... 434/31 |
| 4,718,064 | A | * | 1/1988 | Edwards et al. ............... 703/24 |
| 4,767,334 | A | * | 8/1988 | Thorne et al. ................ 434/29 |
| 4,842,520 | A | * | 6/1989 | Dupont .................. 340/815.66 |
| 5,009,598 | A | * | 4/1991 | Bennington ................. 244/194 |
| 5,015,189 | A | * | 5/1991 | Wenzinger, Jr. ............. 348/121 |
| 5,023,791 | A | * | 6/1991 | Herzberg et al. .......... 324/73.1 |
| 5,147,206 | A | | 9/1992 | Golenski |
| 5,222,893 | A | * | 6/1993 | Hardesty ..................... 434/29 |
| 5,260,874 | A | * | 11/1993 | Berner et al. ............... 434/242 |
| 5,286,202 | A | | 2/1994 | de Gyarfas et al. |
| 5,320,538 | A | | 6/1994 | Baum |
| 5,551,875 | A | | 9/1996 | Shaffer et al. |
| 5,552,984 | A | * | 9/1996 | Crandall et al. .............. 701/31 |
| 5,607,306 | A | * | 3/1997 | Bothwell ..................... 345/173 |
| 5,741,135 | A | | 4/1998 | Bennett |
| 6,033,226 | A | * | 3/2000 | Bullen ........................ 434/219 |
| 6,319,008 | B1 | * | 11/2001 | Mickelson et al. ........... 434/29 |

OTHER PUBLICATIONS

AUTOTESTCON '94, IEEE Systems Readiness Technology Conference: "Cost Effective Support Into the Next Century," Sep. 20–22, 1994, *Avionics maintenance training using equipment simulation*, S. D. Royse, pp. 139–145.
Aerospace and Electronics Conference, 1996. NAECON 1996, Proceedings of the IEEE 1996 National, May 20–23, 1996, *Technology insertion and reuse in the development of research simulators*, R. L. Overdorf, pp. 557–564, vol. 2.
Aerospace and Electronics Conference, 1989. NAECON 1989, Proceedings of the IEEE 1989 National, May 22–26, 1989, *The use of new technologies in the design and development of F–16 maintenance trainers*, J. Saunders, pp. 886–893, vol. 2.

* cited by examiner

Primary Examiner—Derris H. Banks
Assistant Examiner—Dmitry Suhol
(74) Attorney, Agent, or Firm—Finnegan, Henderson, Farabow, Garrett and Dunner, L.L.P.

(57) ABSTRACT

An avionics maintenance training device to train cognitive and psychomotor skills is disclosed. The training device is a physical mock-up of an actual aircraft's cabin assembly. The avionics maintenance training device includes actual avionics components and non-functional and functional physically replicated avionics components of the actual aircraft. The avionics maintenance training device further includes an instructor workstation, a simulator/stimulator, and an interactive electronic training manual. The training device runs the actual operational flight program of the aircraft. The replicated components are three-dimensional components with physical characteristics similar to the avionics components they replicate to teach component removal and replacement skills. The actual and replicated avionics components are located in the training device in positions similar to positions of the avionics components in the aircraft to replicate accessibility. The training device also includes replicated cables that connect to the functional physically replicated components and the simulator/stimulator. The training device further includes placards to replace avionics components that are not pertinent to training.

13 Claims, 17 Drawing Sheets

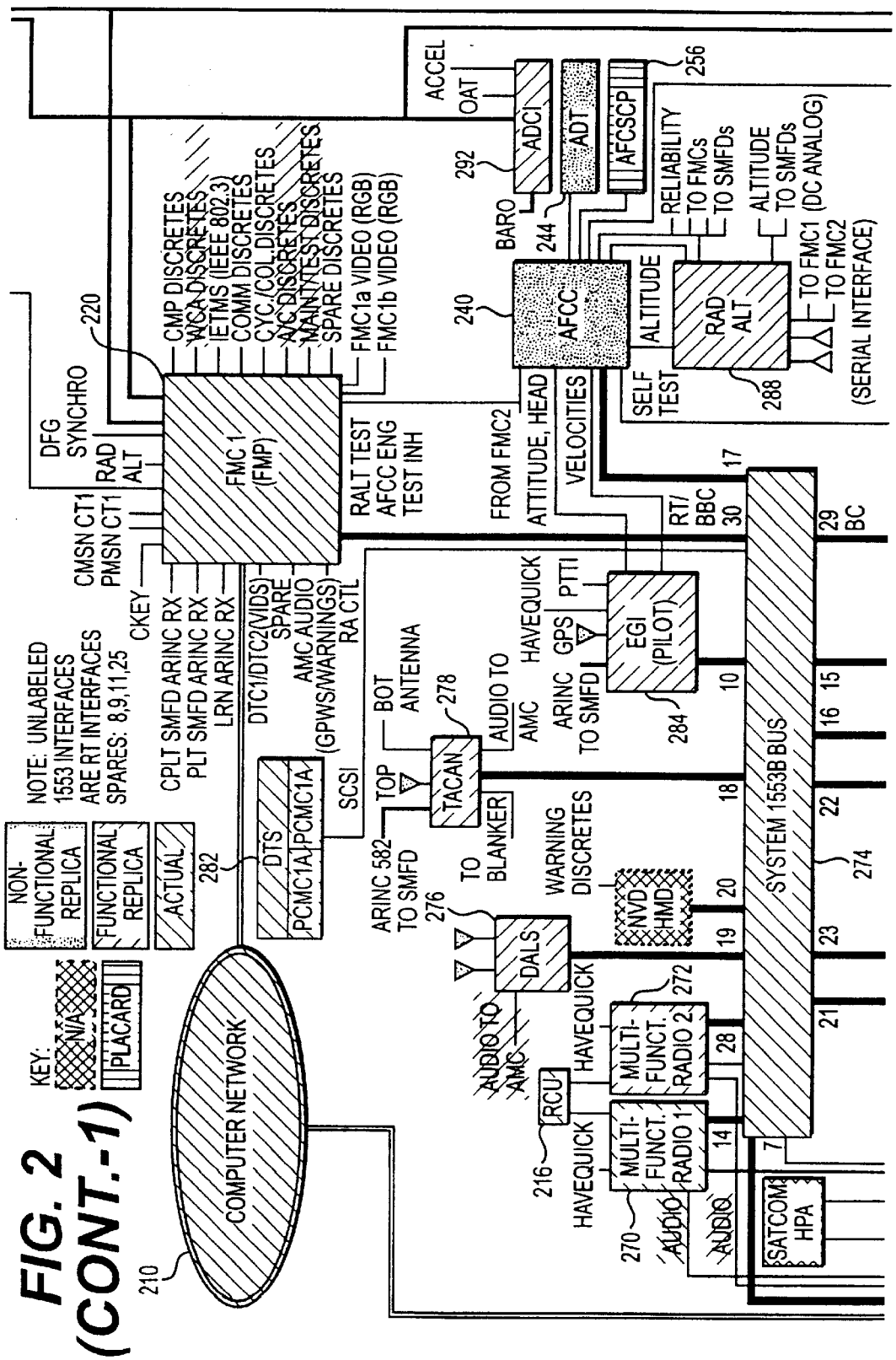
FIG. 2 (CONT.-1)

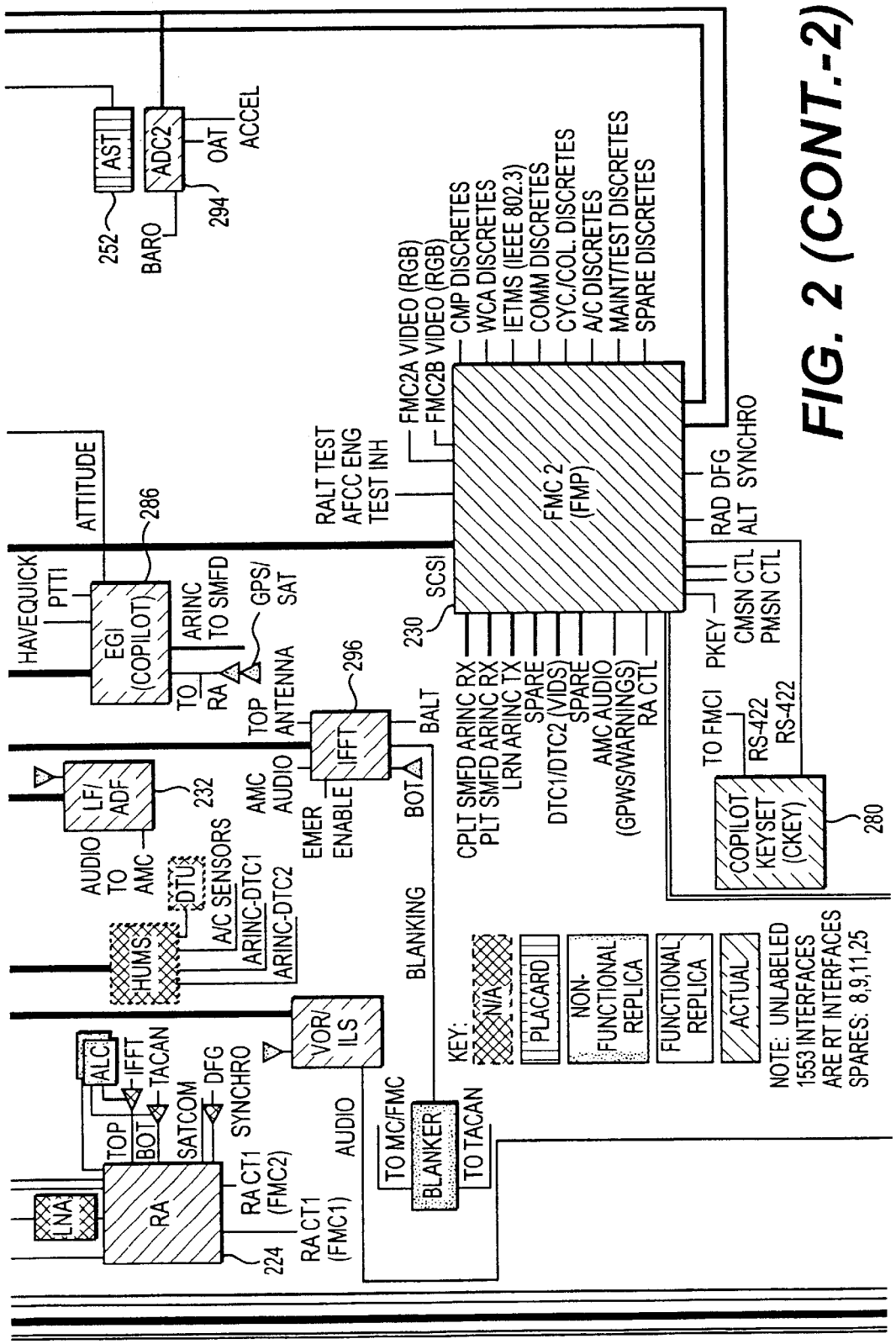
FIG. 2 (CONT.-2)

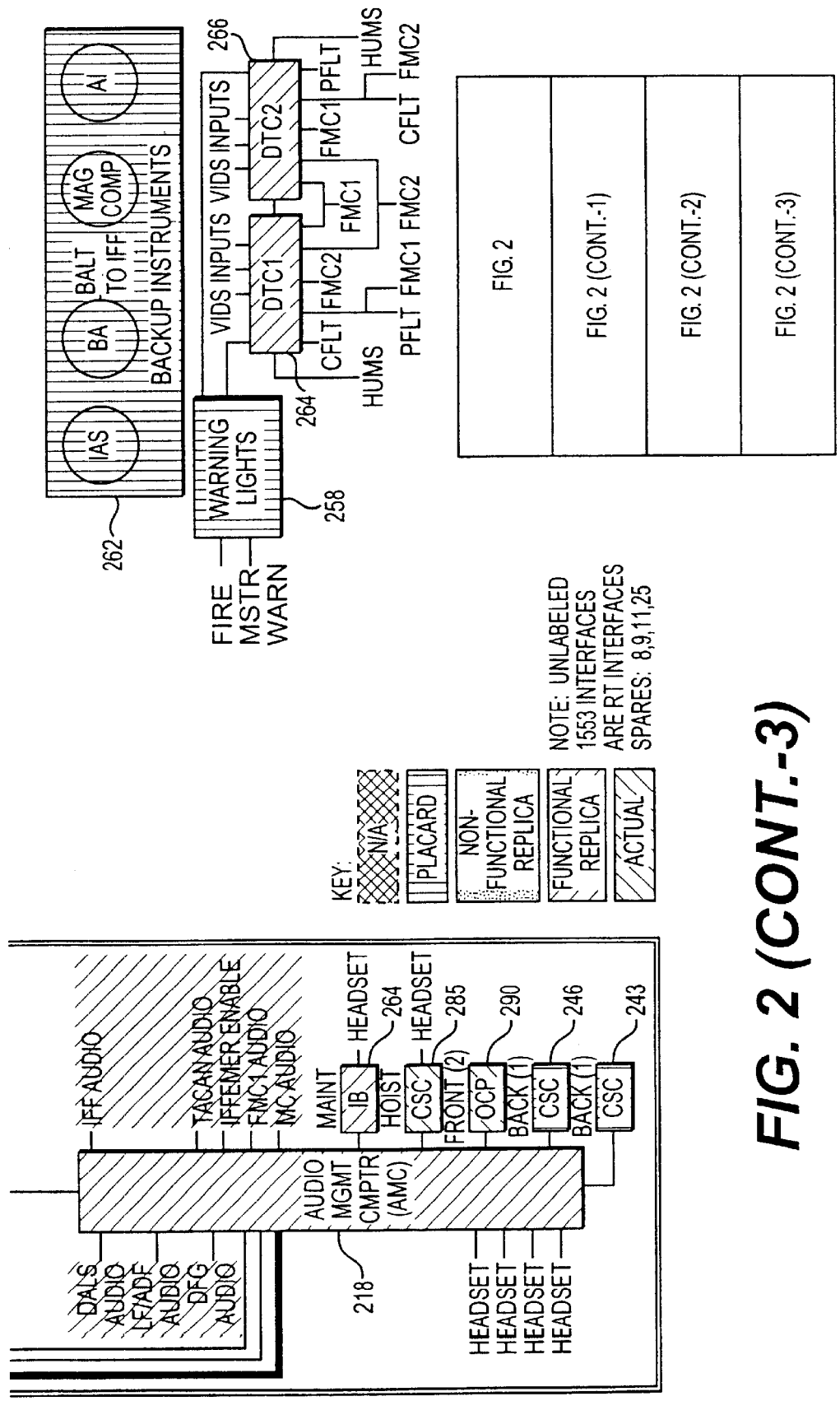

AVIONICS MAINTENANCE TRAINING DEVICE

This patent application claims the benefit of U.S. provisional patent application No. 60/252,809, field on Nov. 22, 2000, the teaching and disclosure of which are hereby incorporated in their entirety by reference thereto.

DESCRIPTION OF THE INVENTION

Field of the Invention

The present invention relates in general to training devices and in particular to avionics maintenance training devices. Still more particularly, the present invention relates to an avionics maintenance training device for training cognitive and psychomotor skills using actual and functional physically replicated avionics components.

BACKGROUND OF THE INVENTION

In the avionics industry, when a problem arises on broad an aircraft, it is important to isolate and fix the problem in a timely and efficient manner. To accomplish this goal, avionics technicians must be properly trained to maintain the equipment on broad the aircraft. Modern military and civilian aircrafts are very expensive and complex. This has lead to an increase in sophisticated training devices for training avionics technicians.

Typically, actual avionics components are used in avionics maintenance training (AMT) devices. However, training devices that use actual avionics components can be expensive. In addition, in a military setting, it is desirable that the training device contains a minimum number of actual avionics components to maximize the supply of the avionics components for other purposes.

More recently in AMT devices, computer simulations have been used to replace the actual avionics components. While such training devices provide a cost effective method from using expensive avionics components, these training devices are not designed to teach important psychomotor skills that are important in the training of maintenance technicians.

In addition, AMT devices that use computer simulations to replace actual avionics components lack realism. Furthermore, it is difficult to update the training device to track equipment software changes.

To train both cognitive and psychomotor skills in maintenance training, it is important that the avionics components in a training device have a similar appearance and feel to the actual components. It is also desirable to have a cost efficient and easily upgradeable training device.

SUMMARY OF THE INVENTION

In accordance with the invention, there is provided a training device that simulates operation of an aircraft for training key cognitive and psychomotor skills. The training device physically resembles an aircraft's cabin assembly and has the same ground clearance as the aircraft. In the training device, the actual avionics components that are not pertinent to training are replaced with placards.

The training device includes a processor for running an actual operational flight program of the aircraft. The training device further includes at least one actual avionics component for providing signals or data to the operational flight program. The training device also includes non-functional and functional physically replicated avionics components, as defined below, to replicate additional avionics components. Still further, the training device includes another processor for running a simulation program to simulate aircraft system conditions. The simulation program also generates signals or data for the functional physically replicated avionics components and generates other signals or data for the operational flight program.

The replicated avionics components are three-dimensional components with physical characteristics similar to the actual avionics components they replicate. The actual and replicated avionics components are located in the training device in positions similar to positions of the avionics components in the aircraft. This allows for the training of key psychomotor skills because the accessibility of these components on the actual aircraft is replicated on the training device.

The training device also includes replicated cables that connect to the functional physically replicated avionics components and the processor running the simulation program. The replicated cables have physical characteristics similar to actual cables on the aircraft and contain actual wires so that the training device can sense disconnected cables.

In another embodiment of the invention, the training device further includes an actual interactive electronic technical manual used by avionics technicians to perform maintenance on the actual aircraft. The training device also includes an instructor workstation for controlling the training device.

In addition, the training device includes aircraft control panels and associated controls, backup instruments, displays, lights, and indicators driven by required equipment voltages and signals. Furthermore, the wiring side of each control panel is individually accessible as in the aircraft.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and, are not restrictive of the invention, as claimed.

BRIEF DESCRIPTION OF THE DRAWINGS

The accompanying drawings, which are incorporated in and constitute a part of this specification, illustrate preferred embodiments of the invention and together with the description, serve to explain the principles of the invention.

DESCRIPTION OF THE PREFERRED EMBODIMENTS

In accordance with the present invention, there is provided a cost efficient and easily upgradeable AMT device that teaches both cognitive and psychomotor skills.

Reference will now be made in detail to the present preferred embodiment of the invention, examples of which are illustrated in the accompanying drawings. Wherever possible, the same reference numbers will be used throughout the drawings to refer to the same or like parts.

Figure 1:
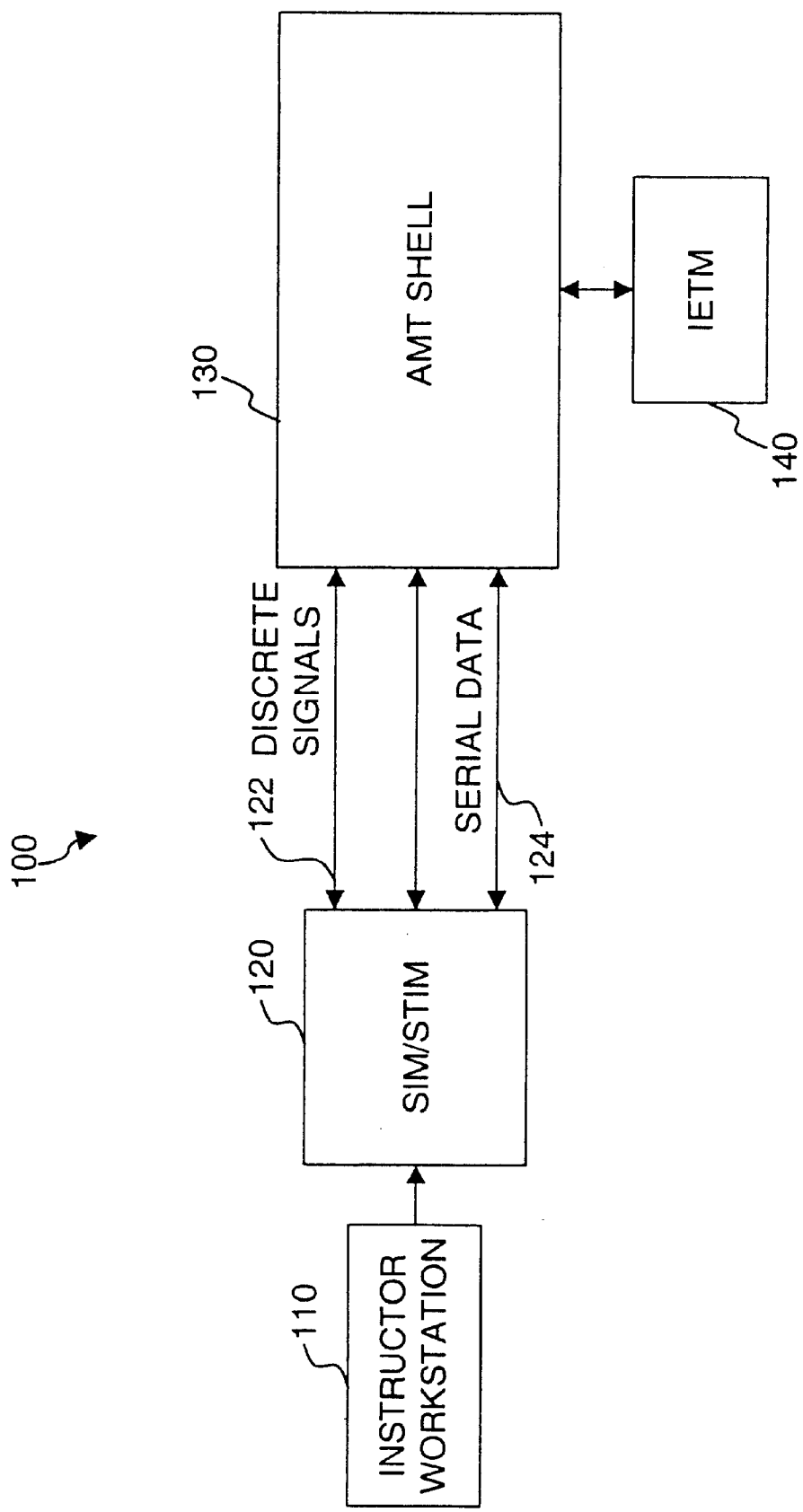
FIG. 1 is a block diagram of an AMT device.

FIG. 1 illustrates the avionics maintenance training (AMT) device 100 of the present invention. The AMT device 100 includes an instructor workstation 110, a simulation/stimulation device (SIM/STIM) 120, an AMT shell 130, and an interactive electronic technical manual (IETM) 140.

Figure 8:
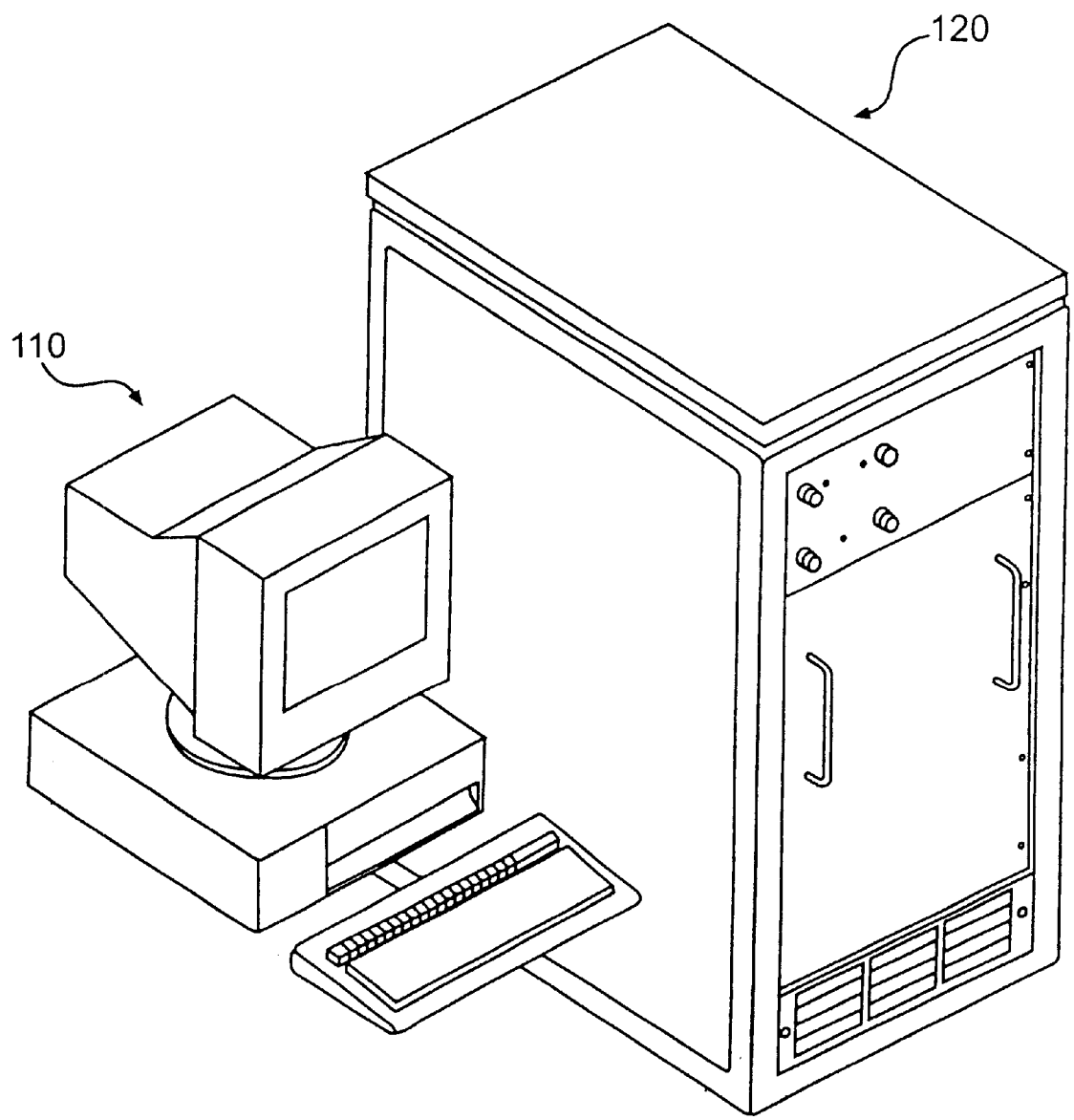
FIG. 8 illustrates an instructor workstation and SIM/STIM.
Figure 9:
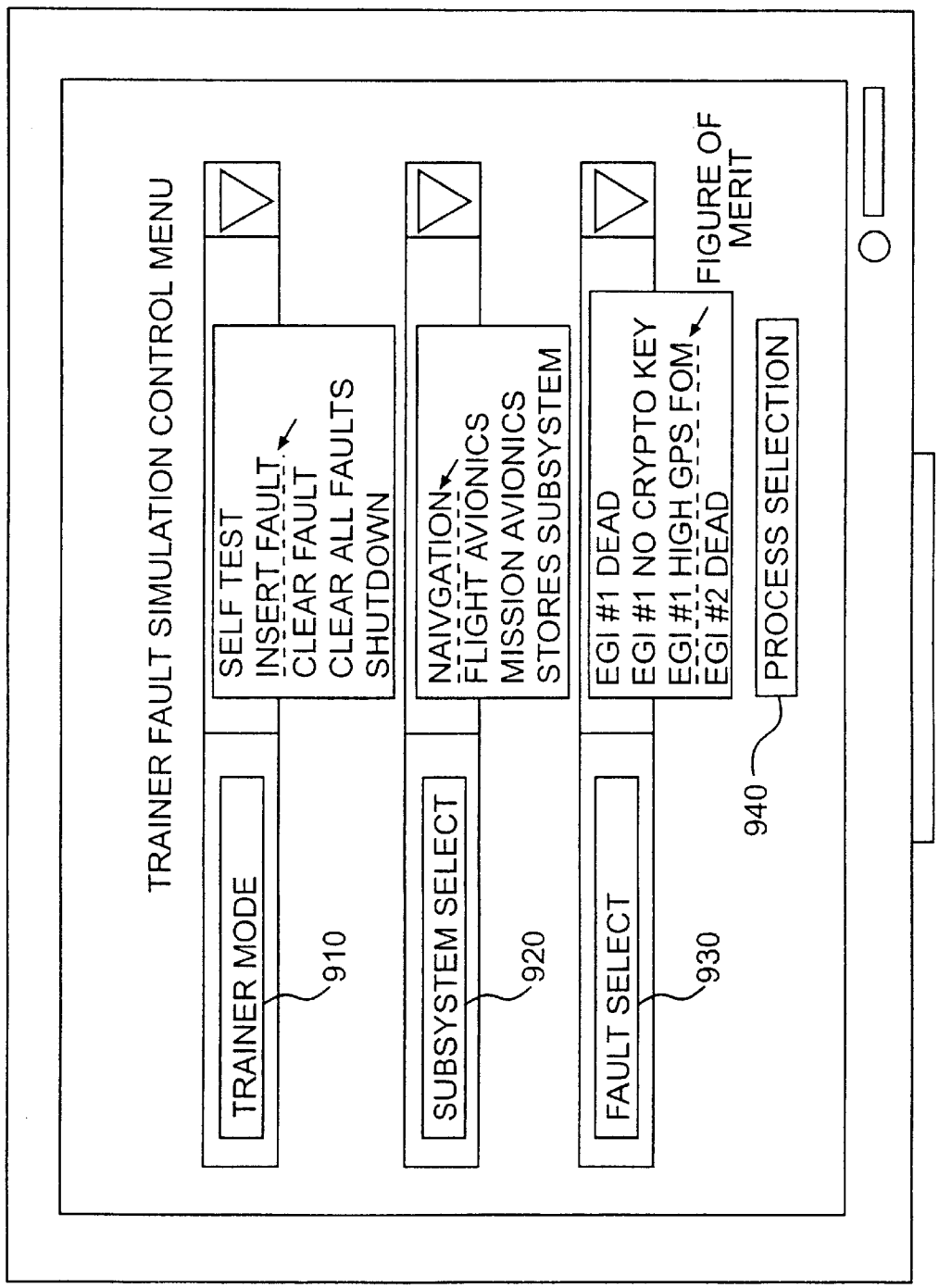
FIG. 9 illustrates a display screen of an instruction workstation.
Figure 10:
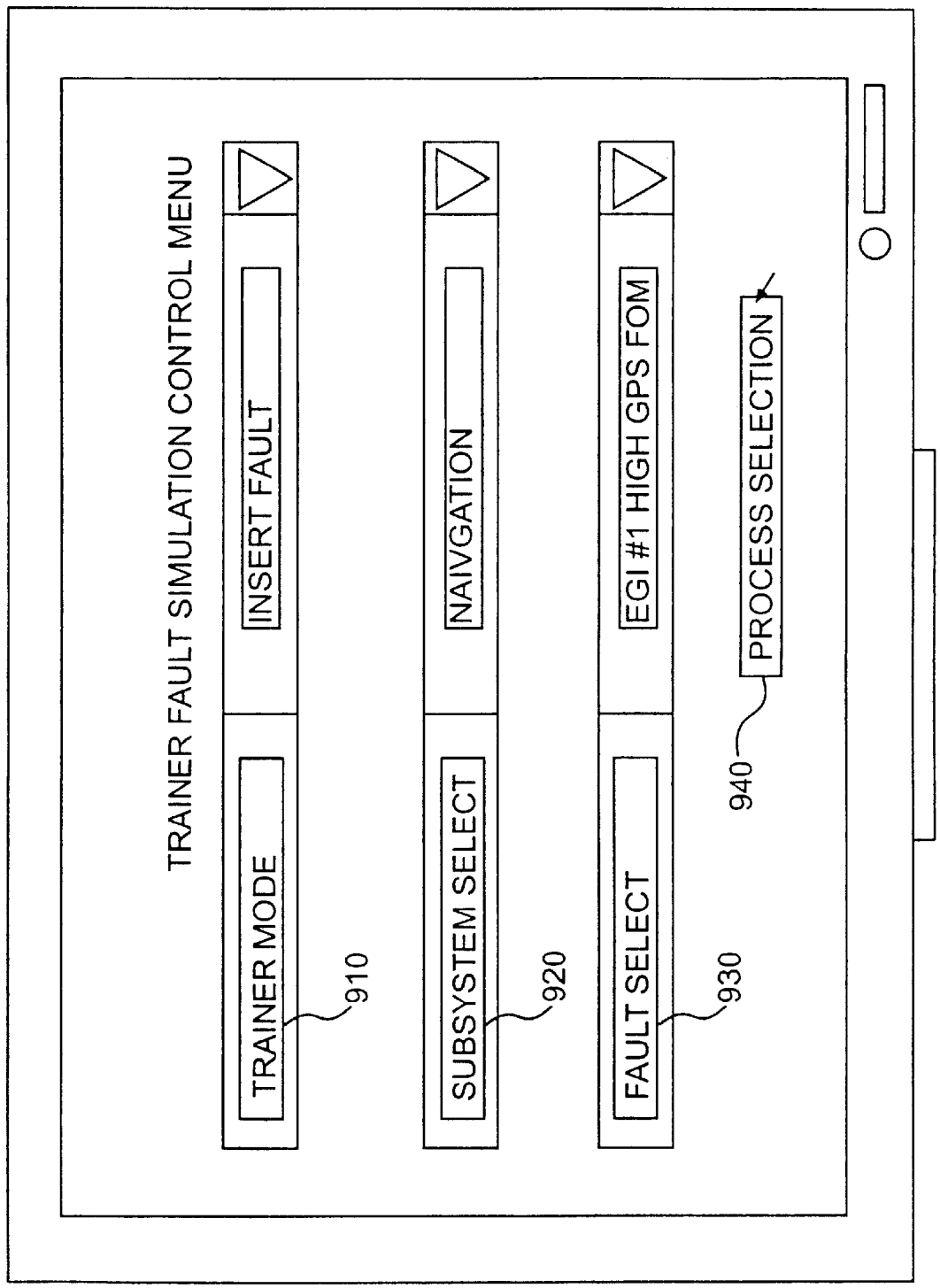
FIG. 10 illustrates a display screen of an instruction workstation.
Figure 11:
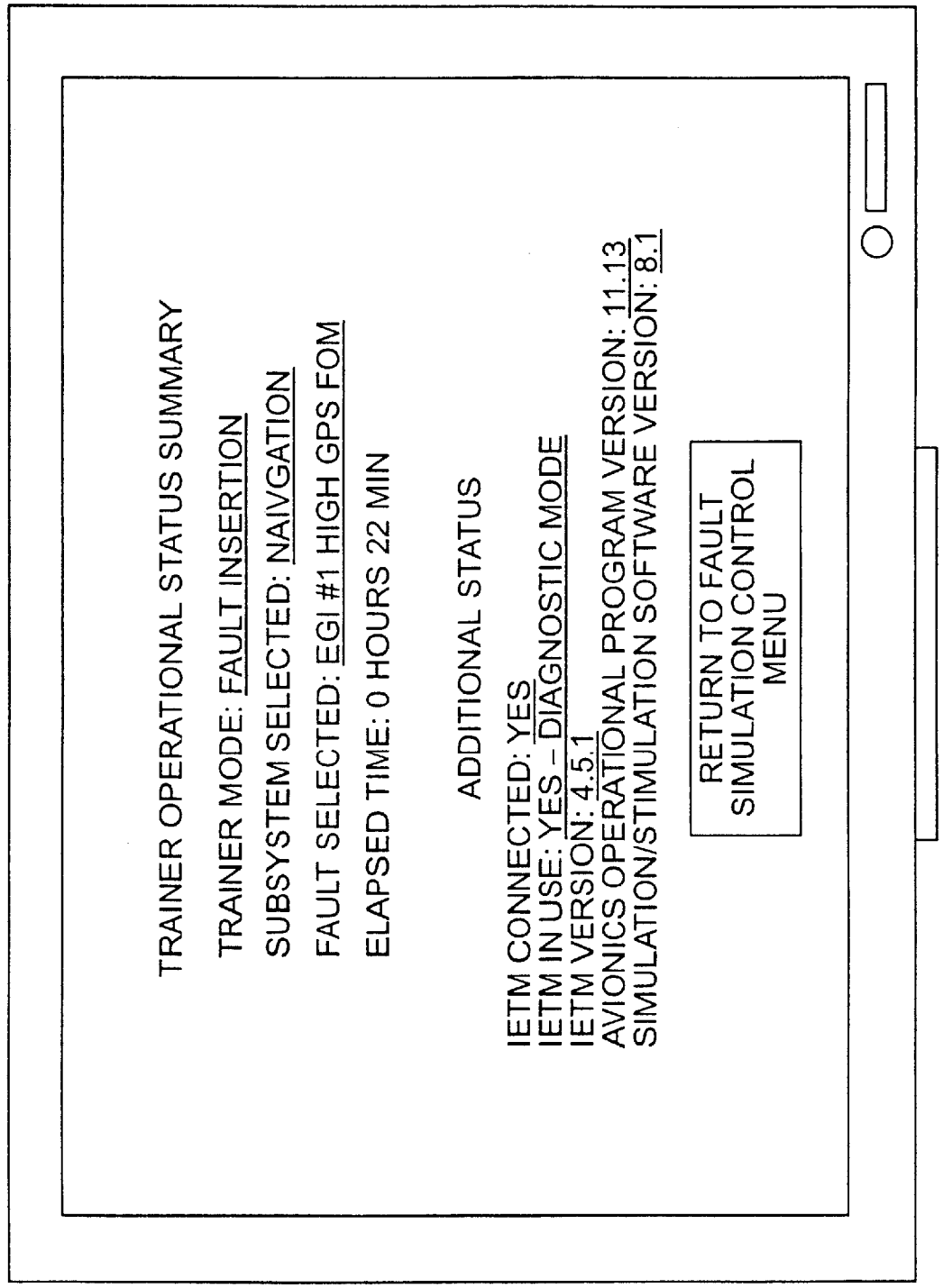
FIG. 11 illustrates a display screen of an instruction workstation.

The instructor workstation 110 provides an instructor with special controls for controlling the AMT shell 130. For example, the instructor workstation 110 provides special controls for controlling system power, system simulations, and malfunction insertion. The instructor workstation 110 may also monitor student performance. The instructor workstation 110, interfaces with the avionics components of the AMT shell 130 via the SIM/STIM 120 and will be described in further detail below. In the preferred embodiment, the instructor workstation 110 is a personal computer, as shown in FIG. 8, using a Windows-type interface or other graphical user interface, examples of which are shown in FIGS. 9–11. The instructor workstation 110 is connected to the SIM/STIM 120 via a serial connection, which is not shown.

The instructor controls the AMT shell 130 by selecting commands from pull-down menus or other selection methods. FIG. 9 shows an instructor selecting options under the trainer mode 910, the subsystem select 920, and the fault select 930 pull-down menus. The instructor may, for example, select a set of commands to simulate a complete failure of a particular component in the AMT shell 130. The instructor may also select a set of commands to simulate a component operating in a degraded condition (e.g., the component communicates but sends status words indicating performance anomalies). FIG. 9 shows the instructor selecting a set of commands to simulate the degradation of a component in the AMT shell 130. FIG. 10 shows the display screen of the instruction workstation 110 after the instructor makes the selections. The instructor may process the selections by pressing a process selection box 940. FIG. 11 illustrates a display screen of the instruction workstation 110 that shows the status of the AMT device 100 and other related information.

Still further, the instructor may select a set of commands to simulate a component functioning properly but receiving an improper input. Intermittent problems can also be simulated with the selection of the appropriate commands. For example, a component in the AMT shell 130 may be simulated to malfunction intermittently. In addition, bad software loads may be simulated. Examples of bad software loads include situations when (1) the system will not boot; (2) the system will start to boot, but the software is not fully loaded; and (3) the software successfully loads, but does not function properly.

The SIM/STIM 120, as shown in FIG. 1, generates discrete signals and serial data for use by the AMT shell 130. As will be described in further detail below, the AMT shell 130 comprises actual avionics components and functional physically replicated avionics components. The SIM/STIM 120 generates serial data so that the functional physically replicated components appear functional to an operational flight program of the AMT shell 130. The operational flight program of the AMT shell 130 is preferably the same as the operational flight program of the actual aircraft. The SIM/STIM 120 inputs the serial data, via an MIL-STD 1553B connection 124, to a System 1553B Bus 247 (shown in FIG. 2) in the AMT shell 130. The SIM/STIM 120 inputs the discrete signals, via wires 122, to flight management computers 220, 230 (shown in FIG. 2) and other actual components of the AMT shell 130 to communicate other vital information to the AMT shell 130.

Figure 12:
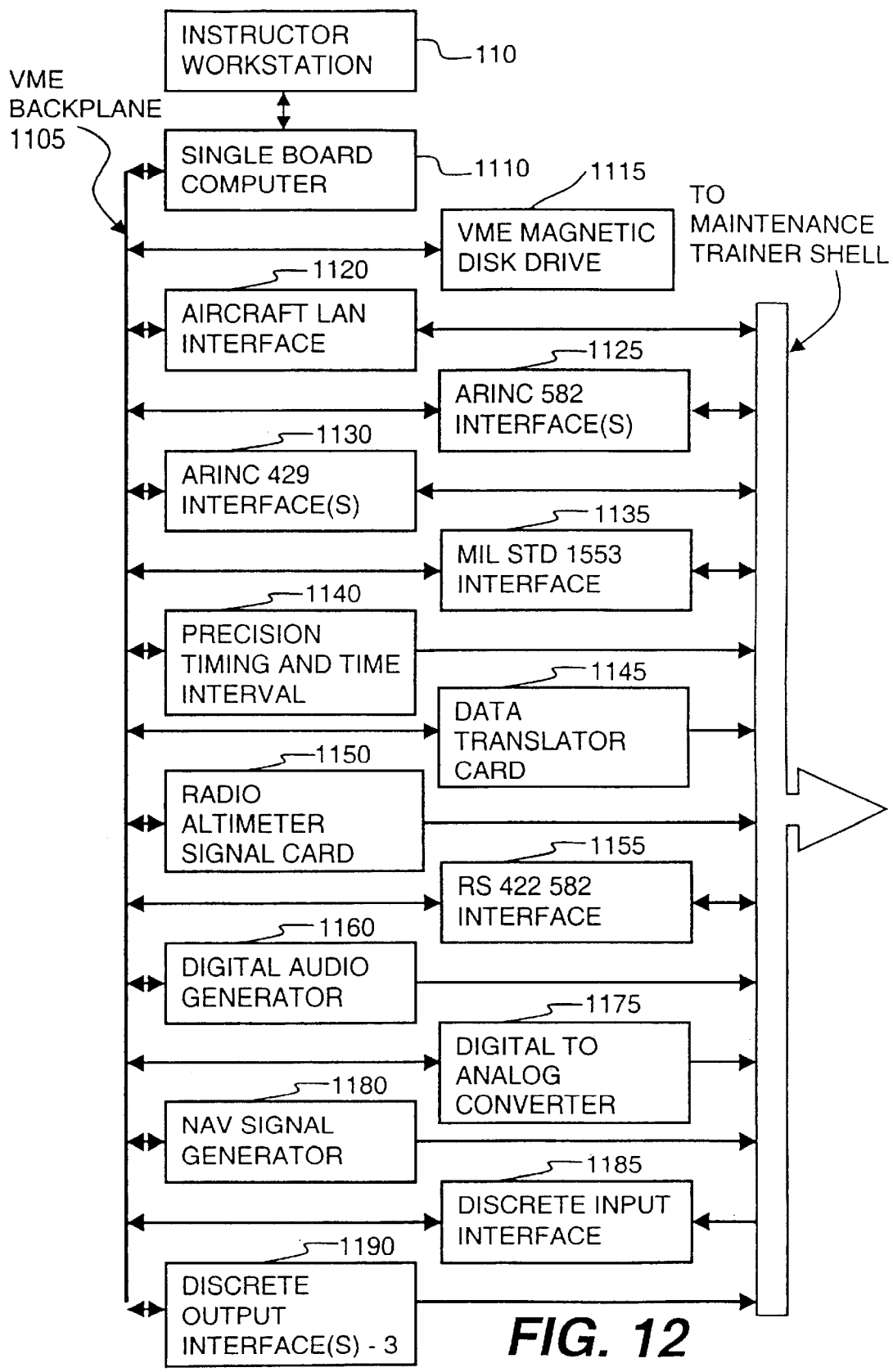
FIG. 12 is a block diagram of a SIM/STIM.

FIG. 12 shows a block diagram of the SIM/STIM 120, for example. The SIM/STIM 120 consists of a chassis backplane 1105 for interconnecting computers and processing devices to generate discrete signals and serial data for use by the AMT shell 130. The instructor workstation 110 connects to the single board computer 1110 of the SIM/STIM 120. The single board computer 1110 runs a simulation program and interacts with the components connected to the backplane 1105 to generate the signals needed by the AMT shell 130. An example of a system specification for the SIM/STIM 120 is provided in Appendix A. The various components of the SIM/STIM 120 will be discussed in further detail below with reference to the AMT shell 130.

As mentioned above, the instructor workstation 110 interfaces with the AMT shell 130 via the SIM/STIM 120. For example, if the instructor selects a set of commands in the instructor workstation 110 to simulate a complete failure or degradation of a component in the AMT shell 130, the SIM/STIM 120 generates serial data and discrete signals for the AMT shell 130.

The IETM 140 is an electronic device that allows an avionics maintenance trainee to read documentation to assist the trainee in servicing the AMT shell 130. The IETM 140 is the same as or similar to the actual electronic device used by avionics maintenance technicians to perform maintenance on an actual aircraft. The IETM 140 connects into the computer network 210 in the AMT shell 130. The IETM 140 instructs the flight management computers 220, 240 to run diagnostic tests and analyzes the results from the diagnostic test. Based on these tests, the IETM 140 automatically displays information to assist the trainee in servicing the aircraft.

Figure 3:
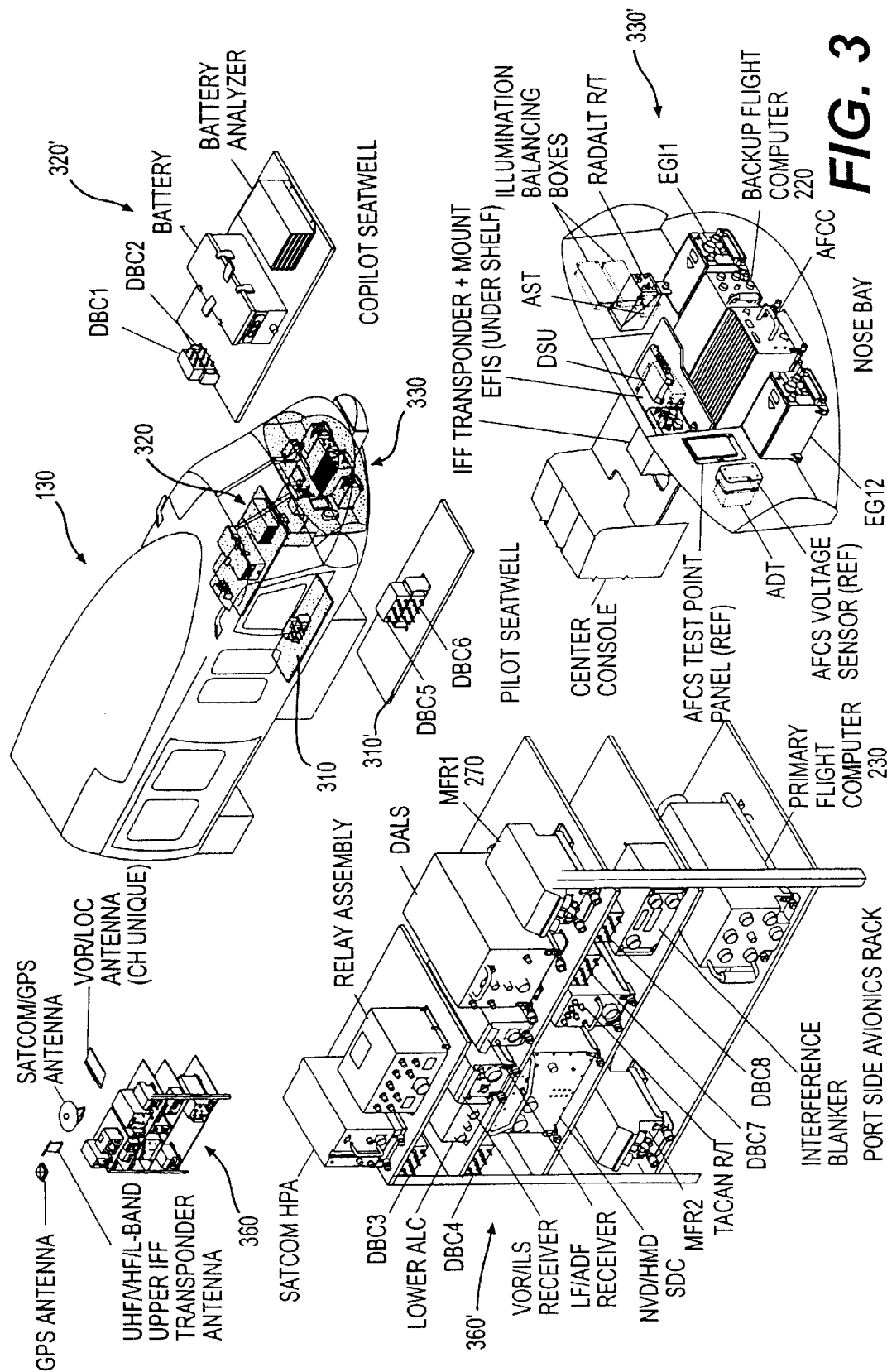
FIG. 3 illustrates an AMT shell, which resembles the actual aircraft's cabin assembly.
Figure 4:
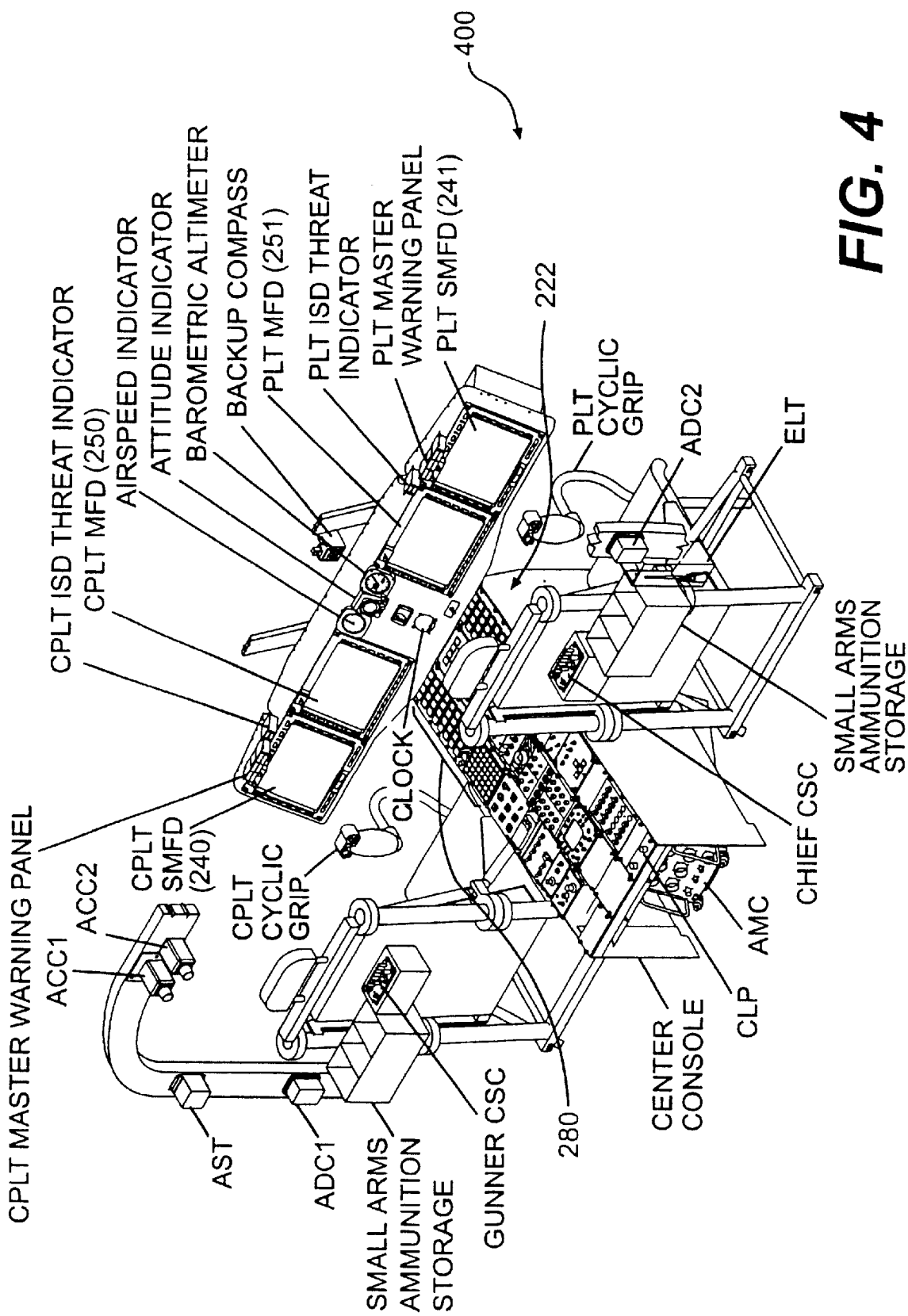
FIG. 4 illustrates a cockpit layout of the AMT shell.
Figure 5:
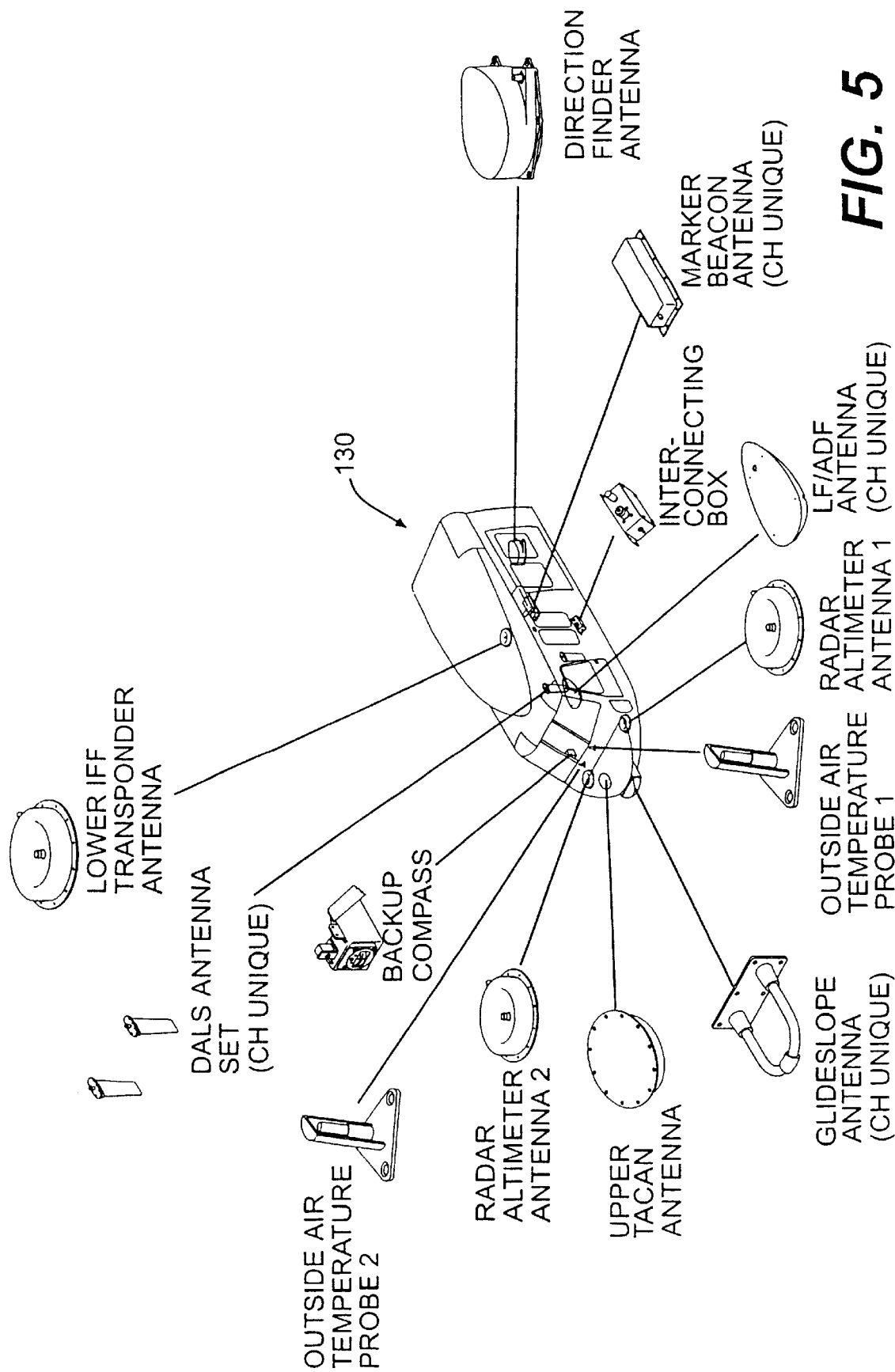
FIG. 5 illustrates antenna locations of the AMT shell.

The AMT shell 130 is shown in FIGS. 3–5 in greater detail. The AMT shell 130 is a physical mock-up of the actual aircraft cabin assembly. The height of the AMT shell 130 off the training room floor is the same as the height of the actual aircraft off the deck of a ship, for example, so that the trainee learns the psychomotor skills needed to access components on the actual aircraft.

The AMT shell 130 of the present invention is similar in appearance to the cabin assembly of the United States Navy MH-60S Helicopter. FIG. 4 illustrates the cockpit layout of the MH-60S Helicopter, which the AMT shell 130 replicates. Lockheed Martin Systems Integration developed the cockpit layout.

FIGS. 3–5 illustrate the components found in the AMT shell 130. The AMT shell 130 consists of actual components, functional physically replicated avionics components, and non-functional physically replicated avionics components of the MH-60S and will be discussed later with reference to FIG. 2.

As shown in FIG. 3, the AMT shell 130 consists of components found in the pilot seatwell 310, the copilot seatwell 320, the nose bay 330, and the port side avionics rack 360 of the actual aircraft. These components are shown in greater details in FIG. 3 by the sections labeled 310', 320', 330', and 360', respectively. The components in the pilot seatwell 310, copilot seatwell 320, and the nose bay 330 are located in the AMT shell 130 in the same relative positions as they are in the actual aircraft. By placing these components in the same location as on the actual aircraft, the AMT shell 130 can train both cognitive and psychomotor skills needed to efficiently and effectively service the actual aircraft.

Figure 6:
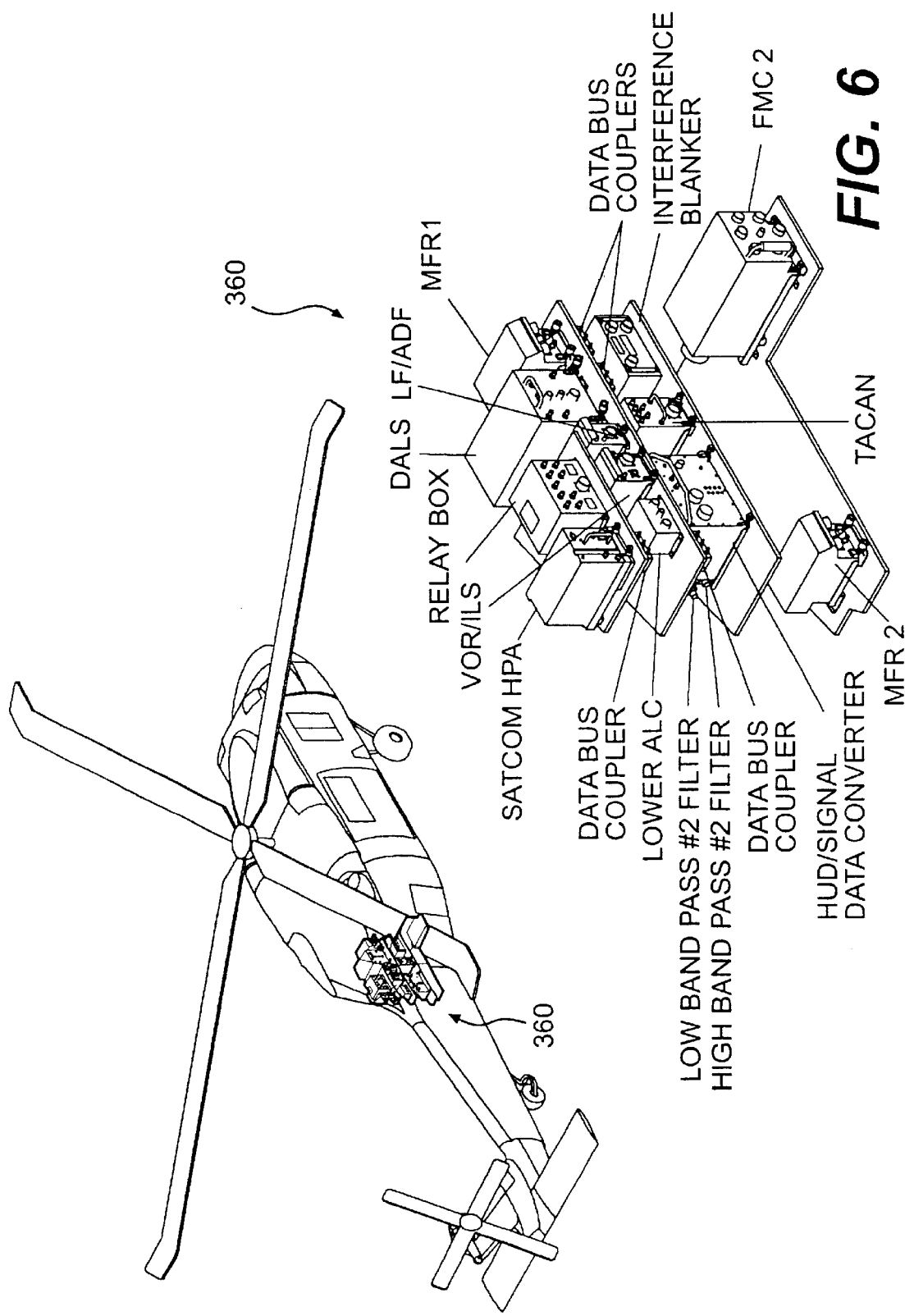
FIG. 6 illustrates locations of particular components in the aircraft.

The components on the port side avionics rack 360 are located near the back of the MH-60S Helicopter as shown in FIG. 6. Because the AMT shell 130 only replicates the aircraft cabin assembly, the components on the port side avionics rack 360 are located behind the AMT shell 130 cabin assembly as shown in FIG. 3 to simulate the relative position of the port side avionics rack 360 components to the components found in the aircraft cabin assembly.

FIG. 4 illustrates the cockpit 400 of the AMT shell 130. The cockpit 400 of the AMT shell 130 replicates the cockpit of the actual aircraft. The AMT shell 130 also comprises antennas that are positioned in the locations shown in FIG. 5. These antennas are located in the AMT shell 130 in the same positions as they are in the actual aircraft.

As mentioned above, the AMT shell 130 consists of actual components, functional physically replicated components, and non-functional physically replicated components of the MH-60S. A functional physically replicated component is defined as a component that is a physical replica of an actual avionics component with the functionality of the actual component simulated by the SIM/STIM 120. A functional physically replicated component may not contain any electronic circuitry; the SIM/STIM 120 replicates its functionality. A functional physically replicated component is a three-dimensional component of the same or similar size, shape, weight, and/or appearance as an actual component it replicates. A functional physically replicated component can be made of a box, for example, of the same weight as the actual component it replicates. The AMT shell 130 further comprises replicated cables that connect to the functional physically replicated components.

A non-functional physically replicated component is defined as a component that is a physical replica of an actual avionics component, however, the functionality of the actual component is not simulated by the SIM/STIM 120. Components of the actual aircraft that are not pertinent to training are replicated using printed placards, i.e., pieces of metal or other material that look similar to actual computer displays.

Figure 2:
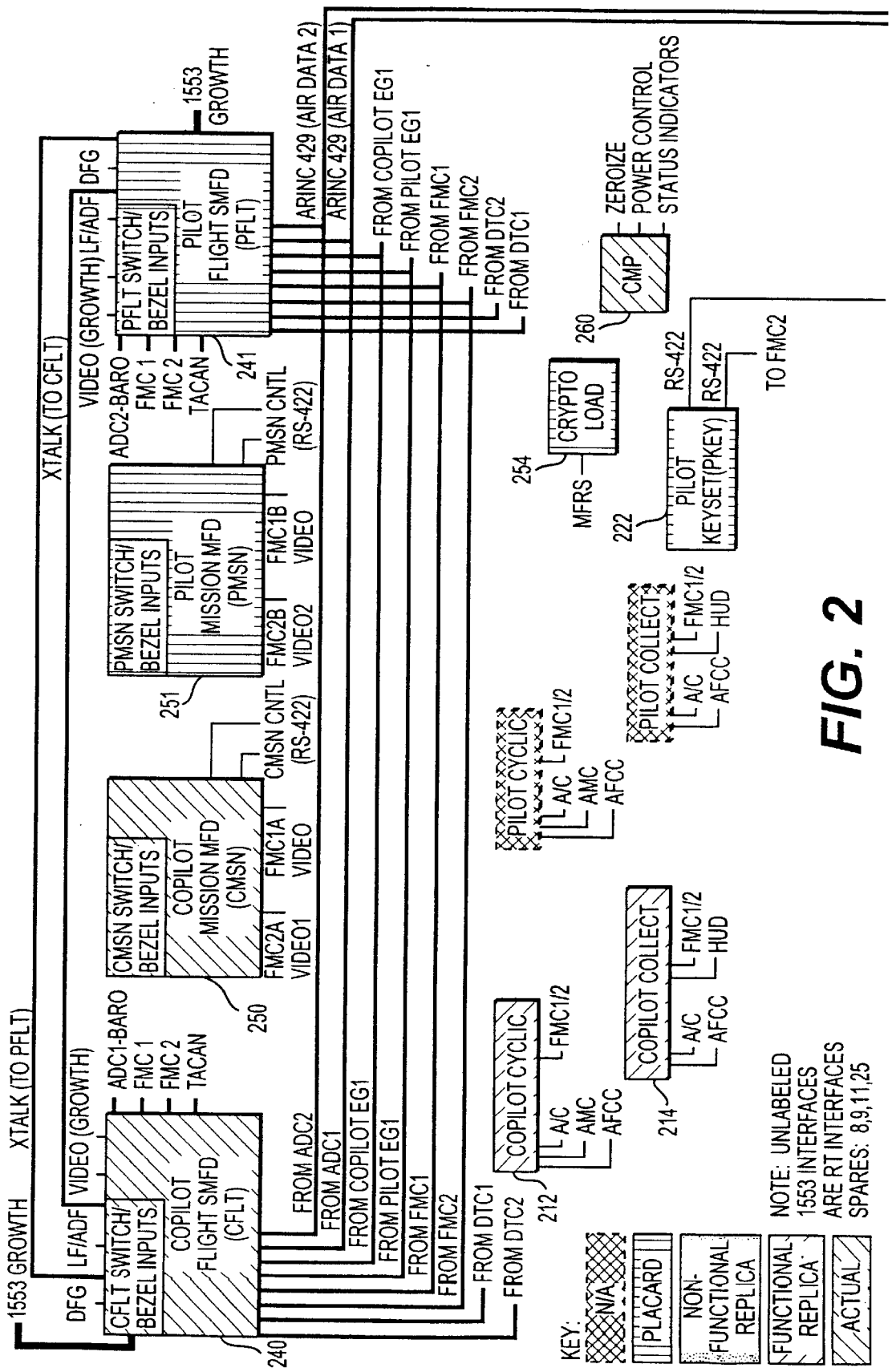
FIG. 2 illustrates the relationship between an AMT device and an actual aircraft.

FIG. 2 depicts a block diagram of the various components of the AMT shell 130 and illustrates the relationship between the actual avionics components and the components of the AMT shell 130. That is, FIG. 2 illustrates whether a component of the AMT shell 130 is an actual avionics component, a functional physically replicated component, a non-functional physically replicated component, or a placard.

Turning to the actual components in the AMT shell 130, preferably the following components in the AMT shell 130 are actual avionics components as found in the actual aircraft: the computer network 210, the Radio Set Control RCU 216, the Flight Management Computer 1 (FMC 1) 220, the FMC 2 230, the Copilot Flight Smart Multifunction Display (CFLT) 240 and Copilot Mission Smart Multifunction Display (CMSN) 250, the Control and Monitor Panel (CMP) 260, Multi-Function Radio-1 (MFR1) 270, the Copilot Keyset (CKEY) 280, the Data Transfer Set (282), the Communication System Control 285, and the Operator Control Panel (290).

The computer network 210 is preferably an actual Ethernet network that is built to military standards and is preferably identical to the network in the actual aircraft.

The Flight Management Computer 1 (FMC 1) 220 and the Flight Management Computer 2 (FMC 2) 230 are preferably computers based on the Motorola architecture and run a Unix operating system. FMC 1 220 and FMC 2 230 are also illustrated in FIG. 3. Preferably, FMC 1 220 and FMC 2 230 are the same computers as used in the actual aircraft. As shown in FIG. 2, FMC 1 220 and FMC 2 230 are connected to the computer network 210. The flight management computers 220, 230 in the AMT shell 130 run the actual aircraft operational flight program. In the actual aircraft, the FMCs 220, 230 process discrete signals and serial data from many different components in the aircraft. In the AMT shell, many of the actual avionics components are not present. Therefore, to properly run the actual aircraft operational flight program in the AMT shell 130, signals must be generated to simulate those avionics components that are not actually present in the AMT shell 130 and are necessary for the proper running of the operational flight program.

Figure 13:
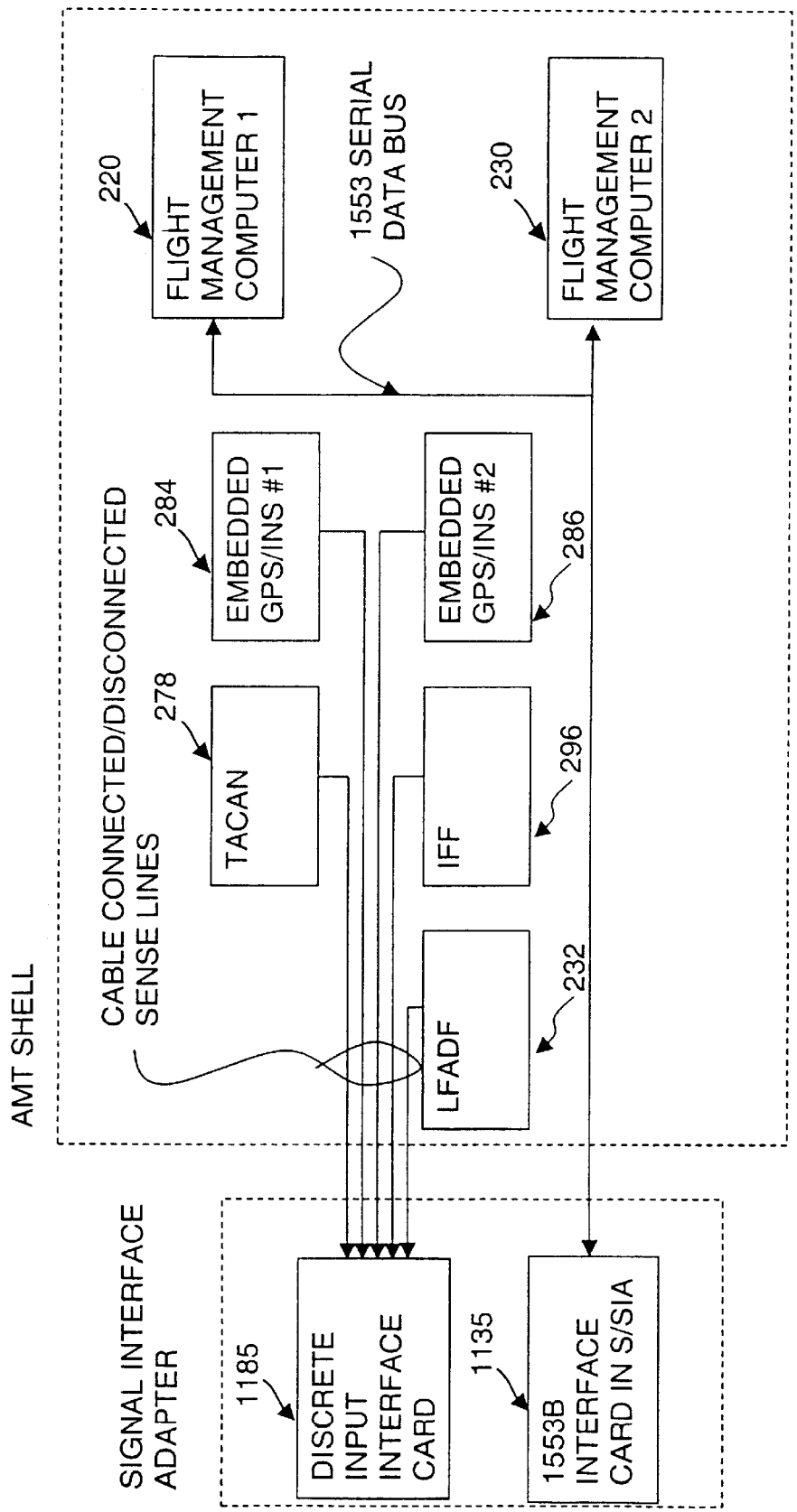
FIG. 13 illustrates connections between the SIM/STIM and AMT shell.

As shown in FIG. 2, the actual avionics components that are not actually present in the AMT shell 130 but are necessary for the proper running of the operational flight program include portions of the data bus, i.e., System 1553 B Bus 274, and all the functional physically replicated components connected to it. The Bus 274 uses the Military Standard (MIL STD) 1553 Interface 1135, shown in FIG. 12, in the SIM/STIM 120. The MIL STD 1553 Interface 1135 also generates serial data to simulate the functional physically replicated components connected to it so that the operational flight program can run properly. More specifically, as shown in FIG. 13, MIL STD 1553 1135 generates serial data to be inputted to FMCs 220, 230 to simulate the functional physically replicated components 218, 224, 232, 264, 266, 272, 276, 278, 284, 286, 288, 296 so that these components appear to be present in the AMT shell 130 to the operational flight program.

Other actual components that are not actually present in the AMT shell 130 but are necessary for the proper running of the operational flight program include the Pilot Flight SMFD (PFLT) 241, Pilot Mission MFD (PMSN) 251, and the Pilot Keyset (PKEY) 222. The Balanced Line Digital Interface Standard (RS 422) Interface 1155 generates the discrete signals to be inputted to the FMCs 220, 230 to simulate components 241, 251, and 222 so that these components appear to be present to the operational flight program.

Still further, there are additional actual components that are not actually present in the AMT shell 130 but are necessary for the proper running of the operational flight program. The Aeronautical Radio Incorporated (ARINC) 582 Interface 1125, the ARINC 429 Interface 1130, the Precision Timing and Time Interval board 1140, the Data Translator Card 1145, the Radio Altimeter Signal Card 1150, the Digital Audio Generator 1160, the Digital to Analog Converter 1175, the NAV Signal Generator 1180, and the Discrete Output Interfaces 1190 each generate discrete signals or serial data for use by the Flight Management Computers 220, 230 to simulate the additional actual components.

By reusing in the Flight Management Computers 220, 230 the same operational flight program developed for the actual aircraft, millions of dollars in software development is saved. Furthermore, the AMT device 100 can be upgraded easily and quickly whenever the software is changed in the actual aircraft. The AMT device 100 is upgraded by reloading the new software in the AMT, for example, by using a PCMCIA card. Therefore, the aircraft and the training device are always at the same configuration level.

The Copilot Flight Smart Multifunction Display (CFLT) 240 and Copilot Mission Smart Multifunction Display (CMSN) 250 are LCD-type computer displays that are identical to the flight and mission displays in the actual aircraft. Pilot Flight SMFD (PFLT) 241 and Pilot Mission MFD (PMSN) 251 are an additional set of computer displays in the actual aircraft for use by a pilot. In the AMT shell 130, PFLT 241 and PMSN 251 are replaced by placards. The CFLT 240, CMSN 250, PFLT 241, and PMSN 251 are also illustrated in FIG. 4.

The Copilot Keyset (CKEY) 280 is an input/output device that has a series of 32 programmable buttons and 42 fixed function buttons for use by a co-pilot. The AMT shell 130 includes a CKEY 280 that is identical to the CKEY in the actual aircraft. The Pilot Keyset (PKEY) 222 is used by pilots and is identical to CKEY 280 in the actual aircraft. In the AMT shell 130, PKEY 222 is replaced by placards. The PKEY 222 and CKEY 280 are also illustrated in FIG. 4. FIG. 6 illustrates the center console of the cockpit in greater detail.

Figure 7:
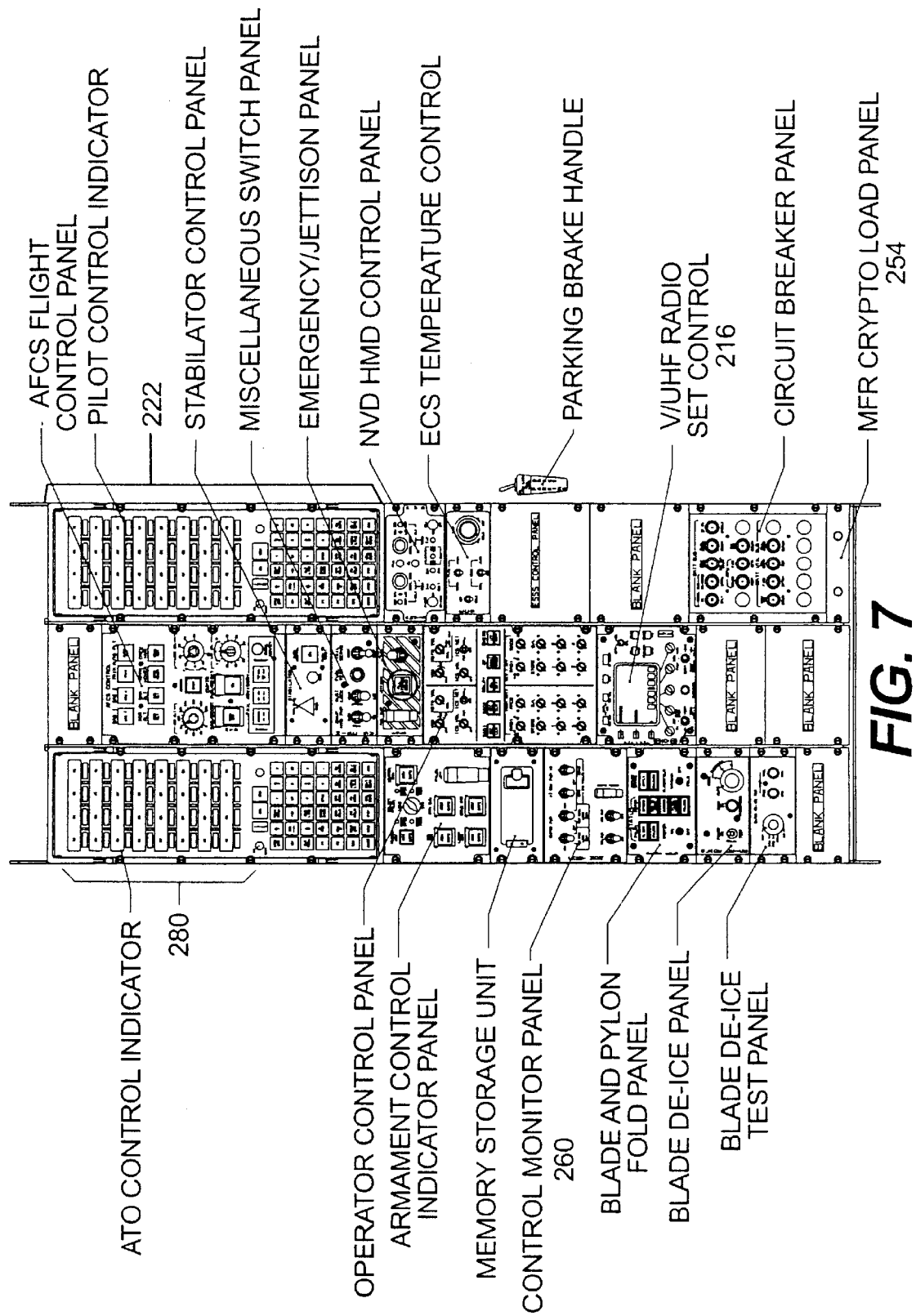
FIG. 7 illustrates a center console of a cockpit in the AMT shell.

The AMT shell 130 includes a Control and Monitor Panel (CMP) 260 that is identical to the CMP in the actual aircraft. The CMP 260 is used to turn on the power for the aircraft, to give the status of the aircraft, and to zeroize (i.e., clear out) all the classified information in the aircraft. The CMP 260 is also illustrated in FIG. 7.

The AMT shell 130 also includes a multi-function radio-1 (MFR1) 270 and panels 285, 290 to connect in headsets for the radio that are identical to the radio and panels found in the actual aircraft. MFR1 270 is also illustrated in FIG. 3.

Cost mainly dictates whether an actual component of an aircraft will be included in the AMT shell 130. As discussed above, reusing software in the AMT shell 130 previously developed for use in the actual aircraft is more cost-effective than developing code specifically for the AMT device.

Figure 14:
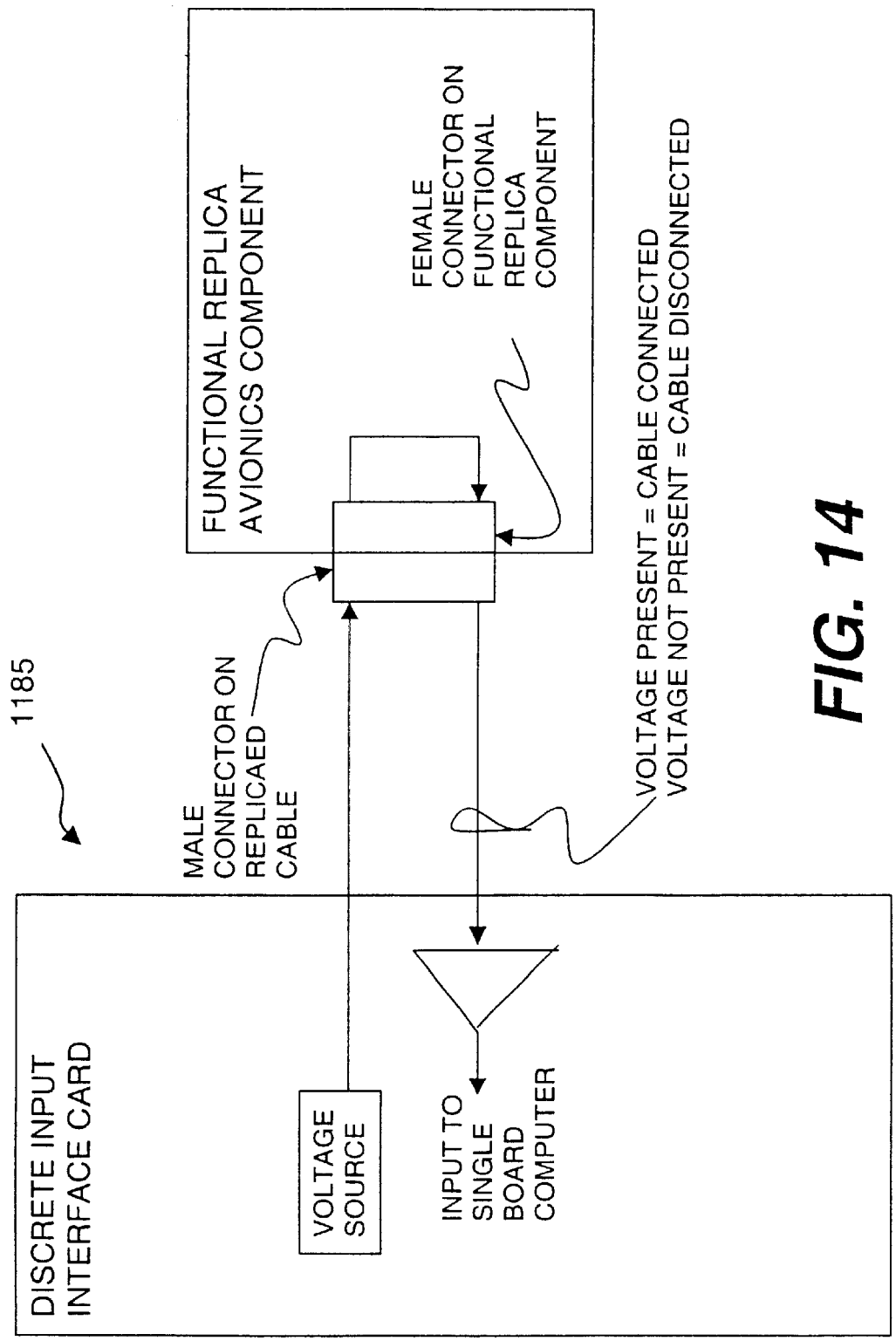
FIG. 14 illustrates a cable connection between the SIM/STIM and a functional physically replicated component of the AMT shell.

Turning to the functional physically replicated components, as discussed above, the boxes that make up these components are designed to be similar to the actual avionics components. The boxes weigh about the same as the actual components and have a similar center of gravity so that they feel like the actual components. Most of the boxes are made out of aluminum. The boxes have real connectors similar to the connectors on the actual components on the aircraft. The cables that connect to the boxes look similar to real cables and contain a few actual wires. The cables are further connected to the discrete input interface 1185 in SIM/STIM 120 as shown in FIG. 13. The cables include a set a wires to carry a DC signal so that the SIM/STIM 120 can sense disconnected cables. As shown in FIG. 14, if there is a complete DC circuit, then the SIM/STIM 120 senses that a cable is connected. If there is an open circuit, then the SIM/STIM 120 senses that a cable is disconnected. Therefore, the wires are used to perform a continuity check to determine if a box is connected. Upon sensing a disconnected cable to a component, the SIM/STIM 120 interrupts the simulation program running in the single board computer 1110 and the simulation program begins to simulate the component as if the cable was actually disconnected.

In the AMT shell 130, the two control sticks, Copilot Cyclic 212 and Copilot Collect 214, are replicated. In an actual aircraft, these control sticks are used by the pilot/copilot to fly an aircraft. They are covered with different buttons and controls. However, in the AMT shell 130, the control sticks need not look much like the actual control sticks because all the details of the control sticks are not necessary for training avionics technician. It is sufficient to have a box sit on each stick with switches on it.

In summary, actual avionics components sufficient to run the operational flight program are included in the AMT shell 130. Also, actual components that are more cost effective to include in the AMT shell 130 as actual components are used. These components preferably include: the computer network 210, the Radio Set Control RCU 216, the Flight Management Computer 1 (FMC 1) 220, the FMC 2 230, the Copilot Flight Smart Multifunction Display (CFLT) 240 and Copilot Mission Smart Multifunction Display (CMSN) 250, the Control and Monitor Panel (CMP) 260, Multi-Function Radio-1 (MFR1) 270, the Copilot Keyset (CKEY) 280, the Communication System Control 285, the Data Transfer System (DTS) 282, and the Operator Control Panel (290).

The functionally physically replicated components in the AMT shell 130 preferably include: the Downed Aviator Location System (DALS) 276, the Tactical Air Navigation (TACAN) 282, the Embedded Global positioning system Inertial navigation system (EGI) pilot 284 and copilot 286, the Radar Altimeter (RADALT) 288, the Air Static Computer 1 292 and 2 294, the Interrogator Friend or Foe (IFF) 296, the Low Frequency Automatic Direction Finder (LF/ADF) 232, the Visual Omni Ranging Instrumentation Landing System (VOR/ILS), the Intercom Box (IB) 264, the Audio Management Computer (AMC) 218, the Relay Assembly (RA) 224, the Multi-Function Radio-2 272, the Air Data Computer 1 (ADC1) 292 and ADC2 294, the Copilot Cyclic 212, the Copilot Collect 214, and the Data Concentrator DTC1 264 and DTC 2 268.

The Automatic Flight Control Computer 242, the Air Data Transducer 244, and Air Speed Transducer 252 are non-functional physically replicated versions of the actual avionics components. The PKEY 222, PFLT 241, Communication System Control Panel CSC 246, 248, PMSN 251, Crypto Load 254, the Automatic Flight Control System Control Panel AFCSCP 256, the Backup Instruments 262 (i.e., airspeed indicator IAS, attitude indicator AI, barometric altimeter BA, and backup compass Mag Comp), and warning lights 258 are all replaced with placard in the AMT shell 130. The Backup Instruments 262 are also illustrated in FIG. 4.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A training device to simulate operation of an aircraft to train cognitive and psychomotor skills, wherein the aircraft comprises actual avionics components used by avionics technicians and wherein the aircraft runs an operational flight program, the training device comprising:

a first processor for running the operational flight program;

at least one actual avionics component for providing signals or data to the operational flight program;

non-functional physically replicated avionics components that are three-dimensional replicas of a first set of corresponding actual avionics components;

functional physically replicated avionics components that are three-dimensional replicas of a second set of corresponding actual avionics components; and a second processor for running a simulation program to generate signals or data to simulate the second set of actual avionics components for the operational flight program;

wherein the non-functional and functional physically replicated avionics components have physical characteristics similar to the corresponding actual avionics components they replicate sufficient to teach component removal and replacement skills, and wherein the at least one actual avionics components and the non-functional and functional physically replicated avionics components are located in the training device in positions similar to positions of the corresponding actual avionics components in the aircraft to replicate accessibility.

2. The training device of claim 1, further comprising:

an instructor workstation for controlling the training device.

3. The training device of claim 1 or 2, further comprising:

an interactive electronic technical manual that is the same as or similar to an actual interactive electronic technical manual used by avionics technicians sufficiently to assist an avionics technician to perform maintenance on the aircraft.

4. The training device of claim 1, wherein the functional physically replicated avionics components comprise real connectors similar to connectors of the actual avionics components on the aircraft they replicate sufficient to teach component removal and replacement skills.

5. The training device of claim 4, further comprising:

replicated cables that are replicas of corresponding actual cables, wherein the replicated cables connect to the functional physically replicated avionics components and the second processor for running the simulation program, wherein the replicated cables have physical characteristics similar to the corresponding actual cables on the aircraft.

6. The training device of claim 5 wherein the replicated cables contain actual wires so that the training device can sense a disconnected cable.

7. The training device of claim 5, further comprising:

aircraft panels and associated controls, instruments, displays, lights, and indicators driven by required equipment voltages and signals, wherein the wiring side of each aircraft panel is individually accessible as in the aircraft.

8. The training device of claim 5 wherein the replicated cables are similar in weight to the corresponding actual cables they replicate.

9. The training device of claim 5 or 8 wherein the replicated cables are similar in size to the corresponding actual cables they replicate.

10. The training device of claim 9 wherein the replicated cables are similar in shape to the corresponding actual cables they replicate.

11. The training device of claim 10 wherein the replicated cables are similar in appearance to the corresponding actual cables they replicate.

12. The training device of claim 1, further comprising:

placards to replace actual avionics components that are not pertinent to training.

13. A training device to simulate operation of an aircraft to train cognitive and psychomotor skills, wherein the aircraft comprises actual avionics components used by avionics technicians, and wherein the aircraft runs an operational flight-program, the training device comprising:

a first processor for running the operational flight program;

at least one actual avionics component for providing signals or data to the operational flight program;

non-functional physically replicated avionics components that are three-dimensional replicas of a first set of corresponding actual avionics components;

functional physically replicated avionics components that are three-dimensional replicas of a second set of corresponding actual avionics components;

a second processor for running a simulation program to generate signals or data to simulate the second set of actual avionics components for the operational flight program;

an instructor workstation for controlling the training device;

an interactive electronic technical manual that is the same as or similar to an actual interactive electronic technical manual used by avionics technicians to perform maintenance on the aircraft;

replicated cables that are replicas of corresponding actual cables, wherein the replicated cables connect to the functional physically replicated avionics components and the second processor for running the simulation program, wherein the replicated cables have physical characteristics similar to the corresponding actual cables on the aircraft; and wherein the replicated cables contain actual wires so that the training device can sense a disconnected cable;

aircraft panels and associated controls, instruments, displays, lights, and indicators driven by required equipment voltages and signals, wherein the wiring side of each panel is individually accessible as in the aircraft; and placards to replace actual avionics components that are not pertinent to training, wherein the training device physically resembles the aircraft's cabin assembly and has the same ground clearance as the aircraft;

wherein the non-functional and functional physically replicated avionics components are similar in size, shape, weight, or appearance to the corresponding actual avionics components they replicate sufficient to teach component removal and replacement skills;

wherein the at least one actual avionics component and the non-functional and functional physically replicated avionics components are located in the training device in positions similar to positions of the corresponding actual avionics components in the aircraft to replicate accessibility; and wherein the functional physically replicated avionics components comprise real connectors similar to connectors of the corresponding actual avionics components on the aircraft they replicate.

* * * * *

UNITED STATES PATENT AND TRADEMARK OFFICE
CERTIFICATE OF CORRECTION

PATENT NO. : 6,572,376 B1
DATED : June 3, 2003
INVENTOR(S) : Craig D. Saunders

Page 1 of 1

It is certified that error appears in the above-identified patent and that said Letters Patent is hereby corrected as shown below:

Column 1,
Line 4, should be inserted:
-- STATEMENT REGARDING FEDERALLY SPONSORED RESEARCH OR DEVELOPMENT
This invention was made with Government support under N00019-00-G-0231 awarded by the Department of the Navy. The Government has certain rights in this invention. --

Signed and Sealed this

Third Day of May, 2005

JON W. DUDAS
*Director of the United States Patent and Trademark Office*